Jan. 1, 1963     W. A. FRITZ     3,071,663
NO-TIP TRACTOR SAFETY
Filed May 24, 1960
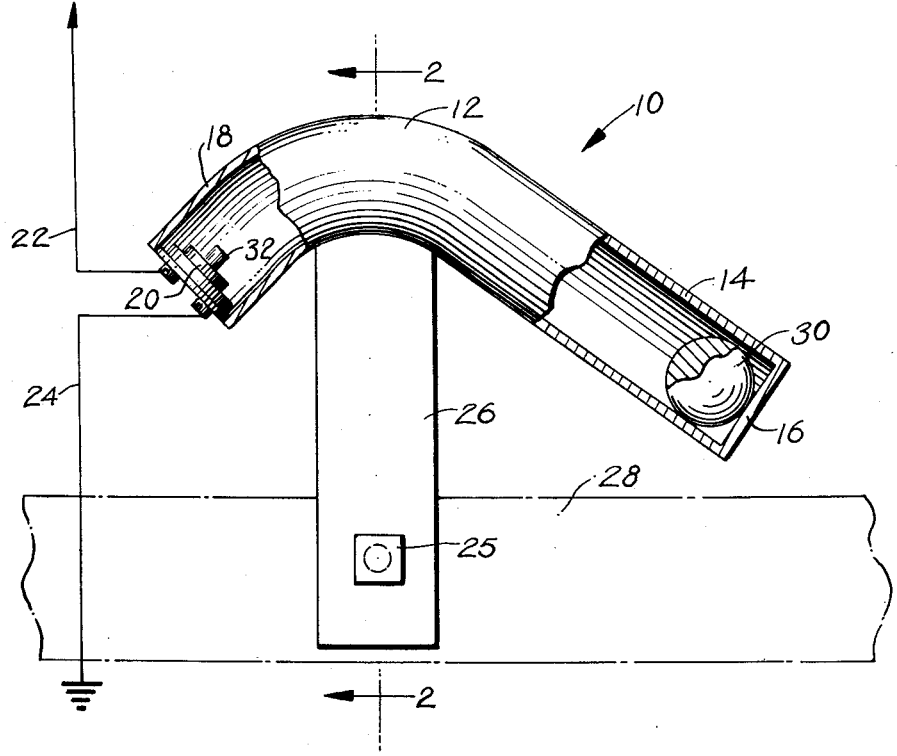
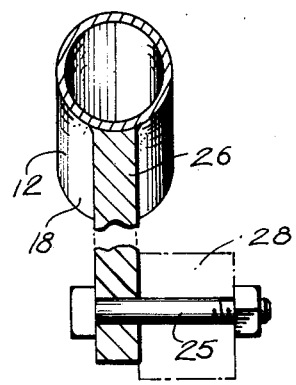
INVENTOR.
WILLIAM A. FRITZ United States Patent Office 3,071,663
Patented Jan. 1, 1963

3,071,663
NO-TIP TRACTOR SAFETY
William A. Fritz, 1244 S. Geyer Road, Kirkwood 22, Mo.
Filed May 24, 1960, Ser. No. 31,443
2 Claims. (Cl. 200—61.52)

This invention relates to vehicles and more particularly to an accessory for tractors.

It is an object of the present invention to provide a safety device for tractors which will effectively short out the ignition of the tractor in the event that the front end of the tractor is tilted upwardly beyond a predetermined angle during use.

Another object of the present invention is to provide a safety switch for tractors of the above type which can be conveniently mounted upon the underframe of any tractor, may be readily serviced and reset during use, and which can be adjusted to operate at any selected tilt angle.

Other objects of the invention are to provide a no tip tractor safety bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side elevational view, with parts broken away, of a tractor safety device made in accordance with the present invention in actual use; and FIGURE 2 is a fragmentary cross sectional view taken along line 2—2 of FIGURE 1.

Referring now more in detail to the drawing, a tractor safety mechanism 10 made in accordance with the present invention is shown to include a tubular main housing 12 having one end 14 closed by an end wall 16, and an opposite end 18 having an end wall with a pressure responsive switch 20 mounted thereupon. One lead 22 is connected between the switch 20 and the distributor of the tractor, whereas the other lead 24 is connected directly to ground. Thus, upon a closing of the switch 20, the distributor is shorted directly to ground, thus cutting out the ignition of the tractor.

A bracket 26 is connected at one end to the central portion of the main housing 12, and has an opposite end mounted upon the tractor underframe 28, such as by a bolt 25, to allow for the selective adjustment of the bracket and housing 12 to adjust the angle of tilt at which the device will operate. A ball member 30 is rollably supported within the main housing 12 and is normally disposed within the one end 14 thereof at rest against the end wall 16. However, in response to an elevation of the front end of the tractor, the one end 14 of the housing will be elevated therewith, so that the ball 30 will roll by gravity along the length of the one end 14 toward the opposite end 18 and into impact engagement with a push button 32 which operates the switch 20.

It will now also be recognized that the particular angle of tilt required to initiate the actuation of the safety device may be adjusted simply by adjusting the angle of the bracket 26 with respect to the underframe of the tractor 28. In the event that the tractor does tilt and this device operates, it may be readily reset simply by loosening the mounting bolt 25 and tilting the bracket 26 to return the ball 30 to its initial position at the one end 14 of the housing against the end wall 16.

While various changes may be made in the detail construction, it shall be understood that such changes shall be within the spirit and scope of the present invention as defined by the appended claims.

What I claim as new and desire to protect by Letters Patent of the United States is:

1. A safety device for preventing the tilting of power driven vehicles comprising a tube, a ball freely supported within the tube, one end of the tube having obstruction means for preventing the ball from rolling out of the tube, the other end of the tube having a switch with a switch element that is movable in response to an impact by the ball, the tube being bent intermediate its ends and having an elongated straight portion between the bent portion and the obstructed end, bracket means for mounting the device to the frame of a vehicle, the bracket means providing adjustment of the position of the tube so that the elongated straight portion extends downwardly from the bent portion at an angle to the horizontal substantially equal to the maximum allowable tilt of the vehicle, and the end having the switch is below the bent portion.

2. The safety device of claim 1 including another straight portion between the bent portion and the end having the switch to provide sufficient momentum for the ball before it reaches the switch element.

References Cited in the file of this patent

UNITED STATES PATENTS

| 1,414,082 | Hall | Apr. 25, 1922 |
| 1,611,219 | Minninger | Dec. 21, 1926 |
| 1,837,533 | Colvin | Dec. 22, 1931 |
| 2,253,957 | Kammerdiner | Aug. 26, 1941 |
| 2,456,799 | Smies | Dec. 21, 1948 |
| 2,692,312 | West | Oct. 19, 1954 |
| 2,950,365 | Bolstad | Aug. 23, 1960 |